United States Patent [19]

Avilov et al.

[11] 3,755,194

[45] Aug. 28, 1973

[54] HYDROGENATION CATALYST

[76] Inventors: Valery Andreevich Avilov, Noginsky Raion, p/o Chernogolovka, ul. Pervaya, 2a, kv. 2; Mikhail Lvovich Khidekel, Noginsky Raion, p/o Chernogolovka, ul. Vtoraya, 1, kv. 3; Olga Nikolaevna Eremenko, Noginsky Raion, p/o Chernogolovka, ul. Tretya, 2, kv. 1; Oleg Nikolaevich Efimov, Noginsky Raion, p/o Chernogolovka, ul. Pervaya, 12, kv. 1; Alina Grigorievna Ovcharenko, Noginsky Raion, p/o Chernogolovka, ul. Pervaya, 11, kv. 3; Pavel Semenovich Chekry, Noginsky Raion, p/o Chernogolovka, ul. Pervaya, 10a, kv. 2, all of Moskovskaya obl., U.S.S.R.

[22] Filed: Feb. 12, 1969

[21] Appl. No.: 798,773

[52] U.S. Cl. ...... 252/429 R, 252/429 B, 260/429 R, 260/429 AR, 260/485 R, 260/537 R, 260/593 R, 260/666 P, 260/667

[51] Int. Cl. ............................................. B01j 11/12
[58] Field of Search ............ 252/429, 429 B, 431 N, 252/431; 260/667, 429 AR

[56] References Cited
UNITED STATES PATENTS
2,953,586  9/1960  Hafner et al. ................. 260/429 AR

*Primary Examiner*—Patrick P. Garvin
*Attorney*—Waters, Roditi, Schwartz & Nissen

[57] ABSTRACT

Hydrogenation catalysts are prepared by forming a complex from equimolar amounts of a platinum group metal halide, e.g. rhodium trichloride, and a $\pi$-bonding aromatic ligand, e.g. aromatic hydrocarbons, alkyl-substituted aromatic quinones, aromatic carboxylic acids, aromatic amino acids, aromatic amino acid peptides and aromatic compounds exhibiting benzenoid-quinoid mesomerism. The complexes are reduced to catalytically active form either during or subsequent to formation.

5 Claims, No Drawings

HYDROGENATION CATALYST

This invention relates to hydrogenation catalysts derived from complex compounds of platinum group metals and to methods of preparing the same.

Known in the art are hydrogenation catalysts derived from complex compounds of platinum group metals, the method of preparing said catalysts consisting of reacting the salts of the aforespecified metals with triphenylphosphine (cf. Brit. Pat. No. 946,062; J.Chem. Soc. No. 12, pp. 1711–1732, 1966).

The known hydrogenation catalysts exhibit a relatively moderate catalytic activity and are capable of hydrogenating only unsaturated compounds containing double and triple bonds.

It is an object of the present invention to eliminate the aforementioned disadvantages.

It is a further and more specific object of the present invention to provide a hydrogenation catalyst derived from complex compounds of platinum group metals which will be noted for its high catalytic activity and will make it possible to effect at a high reaction rate the hydrogenation of diverse organic compounds, such as unsaturated compounds having double and triple bonds, pyridine and aromatic compounds.

These objects have been accomplished, according to the invention, by the provision of a hydrogenation catalyst derived from complex compounds of platinum group metals with bonding aromatic ligands. The metals being with $\pi$ bonding aromatic ligands.

The present catalyst may be prepared by a method which, according to the invention, comprises reacting the salts of platinum group metals with $\pi$-bonding aromatic ligands and reducing the resultant complexes either in the course of or after the reaction.

The aforesaid salts and aromatic ligands are taken in equimolar amounts, although in some instances it is good practice to resort to an excess of aromatic ligands.

Where the procedure involves reducing the complexes as they are being formed, it is expedient to carry out the reaction in boiling ethanol which acts as a reducing agent.

If the complexes are to be reduced after the completion of the reaction, recourse may be had to such reducing agents as sodium boron hydride, dihydropyridine compounds, and so forth.

A great variety of organic compounds may be employed as $\pi$-bonding aromatic ligands, viz., aromatic compounds noted for their pronounced $\pi$-bonding properties, e.g. 1,3,5,-triphenyl-benzene; alkyl-substituted quinones, e.g. duroquinone; aromatic carboxylic acids, e.g. phenylacetic acid; aromatic amino acids, e.g. phenylalanine; aromatic amino acid-containing peptides, e.g. glycylphenylalanine; organic compounds exhibiting benzenoid-quinoid mesomerism, e.g. fluorescein, etc.

The possibility of employing a wide range of organic compounds as the aforesaid aromatic ligands opens up broad vistas in the field of preparing catalysts which exhibit diverse properties.

For example, where use is made of optically active ligands, such as L-tyrosine, it is feasible to obtain a catalyst which is useful for carrying out asymmetric hydrogenation.

Where the ligands used consist of organic compounds exhibiting benzenoid-quinoid mesomerism, the resultant catalyst is noted for its marked stability as evidenced by the fact that the reduction of complexes (complex) conversion to a catalytically active form) can be accomplished directly by using gaseous hydrogen.

The catalyst, according to the invention, comprises dark brown or black amorphous powders which, upon dissolving in dimethylformamide, can be used in hydrogenation processes.

When use is made of rhodamine B as ligand, it is feasible to obtain a catalyst soluble in aqueous ethanol and, hence, to avoid the employment of expensive dimethylformamide as a solvent.

The present catalyst is noted for its semi-sandwich structure. The metal atom contained in the catalyst lends itself, for the most part, to additional stabilization by a complexing group in the side chain of aromatic ligands, e.g. by the carboxylic group.

The catalyst, according to the invention, when used for the hydrogenation of unsaturated compounds under mild conditions (room temperature and hydrogen at atmospheric pressure exhibits outstanding activity which equals 100–200 moles of hydrogen per gram-atom of metal per minute for olefin hydrogenation, said activity being 10–200 times as great as that of the currently available best hydrogenation catalysts. The present catalyst is useful for carrying out rapid and selective hydrogenation of carbonyl-group-containing olefins, e.g. for hydrogenating methyl vinyl ketone to methyl ethyl ketone.

The present catalyst is likewise capable of effecting at a lower, though otherwise adequate rate, the hydrogenation of pyridine and aromatic compounds. This anthracene can be hydrogenated under mild conditions to yield 1,2,3,4,-tetrahydroanthracene, whereas at higher temperature there is obtained 1,2,3,4,5,6,7,8-octahydroanthracene.

For a better understanding of the present invention, the following examples of preparing the hydrogenation catalysts are given by way of illustration.

EXAMPLE 1

0.03 g of $RhCl_3 \cdot xH_2O$ (Rh content, 35 wt. percent) was dissolved in 10 ml of water and into the solution was added 0.06 g of tyrosine, and 5 ml of ethanol was incorporated into the mixture. The mixture was boiled on a water bath for 1.5 hours until the amino acid dissolved completely. Then the solution was cooled down to 0° C and treated with a three-fold excess (in moles in relation to rhodium) of sodium boron hydride in an aqueous solution. The dark-brown floccular precipitate was filtered off, washed with dilute hydrochloric acid (0.01M) to remove excess tyrosine and thereafter dissolved in 15 ml of dimethyl formamide. The dimethyl formamide solution of the catalyst was used for hydrogenating 1 g of maleic acid at room temperature, the hydrogen pressure being atmospheric. The hydrogenation was complete within six minutes and yielded succinic acid.

The ruthenium catalyst was prepared in a similar manner from ruthenium hydroxychloride and aromatic amino acids.

EXAMPLE 2.

To a solution of 0.03 g of $RhCl_3 \cdot xH_2O$ (Rh content, 35 wt. percent) was added a solution of 0.024 g of N-phenylanthranilic acid in 5 ml of ethanol. The mixture was heated on a water bath until there formed a greenish-brown precipitate which, on cooling, was reduced with an excess of sodium boron hydride in an aqueous solution. The resultant dark-brown precipitate was removed by filtration, washed with water and alcohol, and thereafter dried in vacuo. The dry catalyst thus obtained was dissolved in 20 ml of dimethyl formamaide and used for hydrogenating 1 ml of cyclohexene. The hydrogenation was complete within 6 minutes and yielded cyclohexane.

EXAMPLE 3

0.1 g of $RhCl_3 \cdot xH_2O$ (Rh content, 35 wt. percent) was mixed with 0.115 g of fluorescein, 50 ml of aqueous ethanol (1:1) was added thereto and the mixture was boiled on a water bath for two hours. The precipitate was filtered off, washed with acetone and dried at 40°C. 0.015 g of the dry catalyst was dissolved in 15 ml of dimethylformamide, and 1 ml of cyclohexene was subjected to hydrogenation in the solution. The hydrogenation came to completion within 20 minutes and yielded cyclohexane.

EXAMPLE 4.

0.10 g of $RhCl_3 \cdot xH_2O$ (Rh content, 35 wt. percent) was mixed with 0.112 g of fluorescein, 40 ml of aqueous ethanol (1:1) was added thereto and the mixture was heated at 80°C for 1 hour. The resultant solution was filtered and 10 ml of the filtrate was placed in a hydrogenation bottle and purged with hydrogen. There occurs rapid precipitation of dark-brown flocs of the catalyst. The precipitate was filtered off and dissolved in 20 ml of dimethylformamide. The catalyst solution was used for hydrogenating 1 ml of maleic acid. The hydrogenation was complete within 10 minutes and yielded succinic acid.

EXAMPLE 5.

A solution of 0.163 g of rhodamine B in 50 ml of water was added to a solution of 0.1 g of $RhCl_3 \cdot xH_2O$ (Rh content, 35 wt. percent) in 50 ml of ethanol. The precipitate formed under went gradual dissolution as the mixture was being heated on a water bath. The resultant solution was made up to 250 ml with aqueous ethanol (1:1) and heating on the water bath at 80°C was continued for about one hour, heating being accompanied by a gradual intensification of the color of the solution. Next the solution was cooled down to room temperature, 10 ml of the solution was placed in a hydrogenation bottle, purged with hydrogen and shaken for several minutes in a hydrogen atmosphere. The thus obtained solution was used for hydrogenating 1 ml of ethyl maleate. The hydrogenation was complete in six minutes and yielded ethyl succinate.

Although the present invention has been described with reference to a preferred embodiment thereof, it will be readily understood by those skilled in the art that various modifications and alterations may be resorted to without deviating from the spirit and scope of the invention as disclosed in the appended claims.

We claim:

1. A hydrogenation catalyst comprising the reduced reaction product complex of equimolar amounts of rhodium trichloride and a $\pi$-bonding aromatic ligand selected from the group consisting of tyrosine, N-phenyl-anthranilic acid, fluorescein, and rhodamine B.

2. A method for the preparation of a hydrogenation catalyst comprising reacting equimolar amounts of rhodium trichloride and a $\pi$-bonding aromatic ligand selected from the group consisting of tyrosine, N-phenyl-anthranilic acid, fluorescein, and rhodamine B in solution at a temperature of about 80° to 100° to form a complex reaction product and reducing the complex as it is formed or after the complex-forming reaction is complete.

3. A method as in claim 2 wherein the reduction is effected by means of aqueous ethanol during the formation of the complex.

4. A method as in claim 2 wherein the reduction is effected by means of gaseous hydrogen in aqueous ethanol after the complex has formed.

5. A method as in claim 2 wherein the reduction is effected by means of $NaBH_4$ in aqueous solution after the complex has formed.

* * * * *